Oct. 15, 1963 T. S. KULKA 3,107,010

RETAINING MEANS FOR TAPE WOUND ON A REEL

Filed April 10, 1961

INVENTOR

THOMAS S. KULKA

BY Thomas S. Nelson

ATTORNEY

United States Patent Office 3,107,010

Patented Oct. 15, 1963

3,107,010
RETAINING MEANS FOR TAPE WOUND ON A REEL

Thomas S. Kulka, 200 Film Bldg., 2100 Payne Ave., Cleveland 14, Ohio

Filed Apr. 10, 1961, Ser. No. 101,719
9 Claims. (Cl. 206—53)

This invention relates to the storage and handling of materials, and more particularly to devices for retaining tape in place on a reel and preventing inadvertent unwinding thereof. This application is a continuation-in-part of my copending application, Serial No. 810,718, filed May 4, 1959, for "Retaining Means for Tape Wound on a Reel," now Patent No. 3,012,662, dated December 12, 1961.

The use of tape coated with a suitable magnetic material is now widely used for the recording of sound or video program material, and since this tape is relatively thin and fragile, care must be taken in the use and storage of the same in order to prevent damage thereto. Different widths of tape may be utilized for different purposes, and such tape is commonly stored on reels, either before or after recording and in lengths from six hundred feet to several thousand feet. Accordingly, it is important to adequately protect such tape and prevent inadvertent unwinding thereof from the reel on which the same is wound, since as a result of such unwinding, the tape may become easily damaged. Heretofore several different methods have been utilized for retaining the tape on the reel and preventing unwinding thereof.

Previously utilized methods for preventing unwinding of tape stored on a reel have included merely enclosing the reel in a suitable box or other container, and while this, in some cases, adequately serves the purpose so long as the reel remains in the box, upon removal therefrom the tape frequently becomes unwound and may become tangled and damaged. An elastic or rubber band has heretofore been applied around the tape on the reel to prevent unwinding of the same, and while this may adequately serve the purpose in some cases, nevertheless, difficulty has been experienced due to the tendency of the elastic band to slip between the tape and the flanges of the reel, thereby destroying any holding function. Furthermore, it has proven somewhat difficult to hold the reel with the tape wound thereon and apply the elastic band thereto without damage to the tape. Metal clips have also been proposed and utilized, but these are somewhat difficult to use and may easily result in damage to the tape. Also, the use of boxes or containers, as well as devices in the nature of metallic clips, have proved relatively costly and in addition fail to fulfill the purpose for which they are intended.

It is accordingly an object of the invention to provide a retaining means for tape wound on a reel, which means may be conveniently and economically constructed from readily available and inexpensibe materials and which may be conveniently applied to the tape wound on a reel to prevent inadvertent unwinding thereof.

A still further object of the invention is the provision of a retaining means for tape wound on a reel, such means being constructed from elastic material, such as rubber or spring metal, and including means for locating the same on a reel and for preventing inadvertent removal thereof, thereby retaining the tape in position on a reel.

Another object of the invention is the provision of a retaining means for tape wound on a reel in which the means engaging the tape is formed of soft yieldable material thereby precluding damage to the tape.

A further object of the invention is the provision of a retaining means for tape wound on a reel in which means is provided for accommodating the retaining means to reels having different spacing between the flanges for accommodating tape of different widths.

A still further object of the invention is the provision of retaining means for tape wound on a reel, such means including merely an elastic band, together with means on the band for yieldably engaging the tape to retain the same on the reel.

Another object of the invention is the provision of retaining means for tape wound on a reel, which means may be employed without modification of the reel and which will serve to adequately retain the tape in place thereon without damage to either the reel or the tape.

Further objects and advantages of the invention will be apparent from the following description taken in conjunction with the accompanying drawings, wherein.

Figure 1:
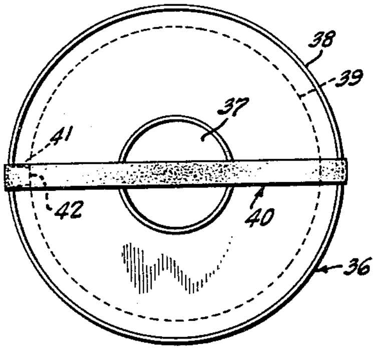
FIG. 1 is a front elevational view of a reel, together with a tape retaining means applied thereto.
Figure 2:
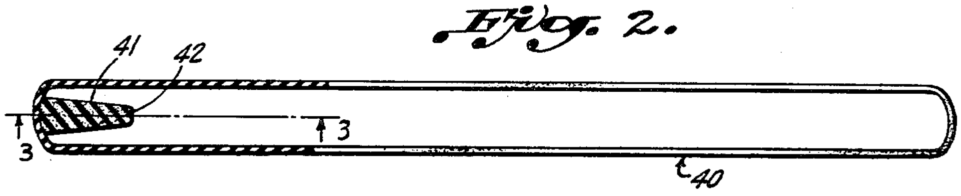
FIG. 2 is an elevational view with parts in section for greater clarity and showing the tape retaining means of FIG. 1.
Figure 3:
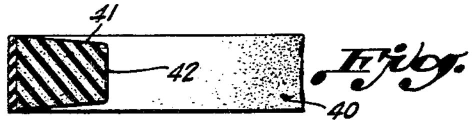
FIG. 3 is a fragmentary sectional view taken substantially on the line 3—3 of FIG. 2.

With particular reference to FIGS. 1 to 3 there is shown a form of retaining means for tape wound on a reel and in which the reel 36 having a hub 37 and side flanges 38 is provided with tape 39 wound thereon to a diameter less than the diameter of the flanges 38 and in which the retaining means may well comprise an elongated elastic band 40 normally of less length than the diameter of the flanges 38 of the reel 36, the band 40 being of sufficient width and thickness and being formed of suitable material to provide the desired tension to retain the same on the reel 36 embracing the flanges 38 as clearly shown in FIG. 1. More specifically, the band 40 is of a length which is equal to less than twice the diameter of the flanges 38 plus twice the distance between the flanges 38.

As clearly shown in FIGS. 2 and 3, a tapered block 41 of yieldable material is secured to the inner surface of the band 40 at one end, and the width of the block at the base attached to the band 40 is substantially equal to the width of the band 40, and the thickness of the block 41 at the base is substantially equal to the space between the flanges 38 of the reel 36.

In utilizing the retaining means shown in FIGS. 1 to 3, it is merely necessary to place the band 40 over the flanges of the reel 36 substantially along a diameter and with the block 41 disposed between the flanges 38 with the inner end 42 of the block 41 engaging the peripheral surface of the tape 39 on the reel 36 to prevent unwinding thereof and retain the same on the reel.

Figure 4:
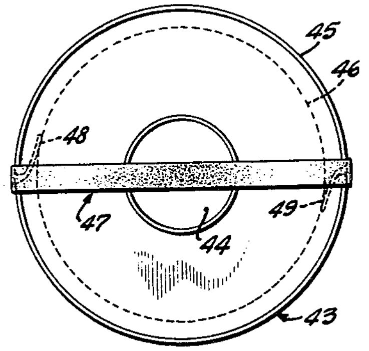
FIG. 4 is a front elevational view of a reel showing a modified form of tape retaining means applied thereto.
Figure 5:
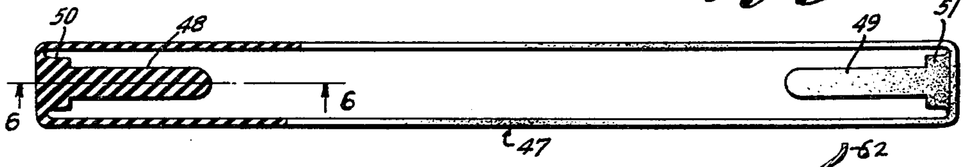
FIG. 5 is an elevational view with parts in section for greater clarity and showing the modified form of retaining means shown in FIG. 4.
Figure 6:
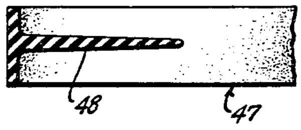
FIG. 6 is a fragmentary sectional view taken substantially on the line 6—6 of FIG. 5; and, FIG. 7 is a fragmentary sectional view, corresponding to FIG. 6, of another modification, showing a metal finger.

The form of the invention shown in FIGS. 4 to 6 is somewhat similar to the form shown in FIGS. 1 to 3, and as shown in FIG. 4 is utilized on a reel 43 having a hub 44 and spaced side flanges 45. Tape 46 is wound on the reel 43 to a diameter less than the diameter of the flanges 45.

The retaining means of FIGS. 4 to 6 may well comprise an elongated elastic band 47 of less length than the diameter of the flanges 45 of the reel 43, and secured to the inner surface of the band 47 at each end are elongated flexible fingers 48 and 49. The width of the base 50 of the finger 48, as well as the width of the base 51 of the finger 49, is substantially equal to the space between the flanges 45 of the reel 43 and the thickness of each finger 48 and 49 is substantially less than the width, and, as shown in FIG. 6, the fingers 48 and 49 may be tapered to provide the desired flexibility.

In use, the retaining means shown in FIGS. 4 to 6 is applied to the reel 43 with the band 47 embracing the flanges 45 substantially along a diameter and with the fingers 48 and 49 flexing in opposite directions, as clearly shown in FIG. 4, and engaging the peripheral surface of the tape 46 in order to prevent unwinding and retain the same on the reel 43. With this form of the invention the flexibility of the fingers 48 and 49 will permit some variation in the diameter of the tape 46 wound on the reel 43 while still retaining the same in place thereon.

Figure 7:
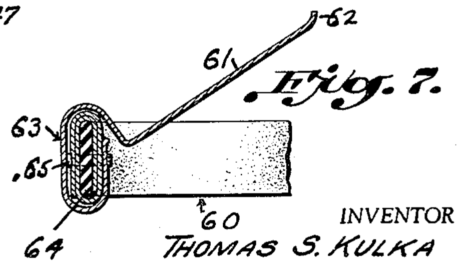

In the modification of FIG. 7 a band 60 is employed, this band being similar to bands 40 and 47. However, instead of the rubber-like finger, the band 60 is provided with a finger 61 formed of spring metal. This finger has a curved end portion 62 to avoid injuring the tape on the reel.

The end 63 of finger 61, opposite to end 62, is formed in the shape of an oval, so as to embrace the band. Preferably one or more convolutions of rubber tape 64 or the like are wrapped around the band in order to reinforce the same. After the tape 64 is applied, the end 63 is wrapped around the tape-covered band, and the entire assembly is held in place by a clip 65. Obviously, the metal finger 61 could be applied to the band in various other manners.

The band 60 with finger 61 is applied to a reel in exactly the same manner as the band 40 is applied, as shown in FIG. 1.

While the tape retaining means of this invention have been described primarily for use in connection with magnetic tapes, it is to be understood that this is for illustrative purposes only, and that such retaining means may be utilized with other forms of tapes, such as motion picture film or the like, and indeed may be utilized for retaining tape on a reel wherever desired. It will be obvious that the above-described forms of the invention provide tape retaining means which may be economically constructed from inexpensive materials and which will operate to adequately retain tape on a reel in the manner and for the purpose intended.

It will be obvious to those skilled in the art that various changes may be made in the invention without departing from the spirit and scope thereof, and therefore the invention is not limited by that which is shown in the drawing and described in the specification, but only as indicated in the appended claims.

I claim:

1. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges, said band being thin and flat and having an inappreciable thickness, whereby it extends only slightly beyond the peripheries of said flanges, and having a tapered block of yieldable material secured to the inner surface of said band at one end, the width of said block at the base being substantially equal to the width of said band and the thickness of said block at the base being substantially equal to the space between said flanges, said block lying wholly within the confines of the peripheries of said flanges, whereby said band may embrace said flanges along a diameter with said block received between said flanges and projecting inwardly into engagement with said tape to prevent unwinding and retain the same on said reel.

2. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges, said band being thin and flat and having an inappreciable thickness, whereby it extends only slightly beyond the peripheries of said flanges, and having a tapered block of yieldable material secured to the inner surface of said band at one end, the thickness of said block at the base being substantially equal to the space between said flanges, said block lying wholly within the confines of the peripheries of said flanges, whereby said band may embrace said flanges along a diameter with said block received between said flanges and projecting inwardly into engagement with said tape to prevent unwinding and retain the same on said reel.

3. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges, said band being thin and flat and having an inappreciable thickness, whereby it extends only slightly beyond the peripheries of said flanges, and having a tapered block of yieldable material secured to the inner surface of said band at one end, said block lying wholly within the confines of the peripheries of said flanges, whereby said band may embrace said flanges along a diameter with said block received between said flanges and projecting inwardly into engagement with said tape to prevent unwinding and retain the same on said reel.

4. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges, and having a flexible finger integral with said band at each end thereof, the width of each finger at the base being substantially equal to the space between said flanges and the thickness of each finger being substantially less than the width, whereby said band may embrace said flanges along a diameter with said fingers received between said flanges and projecting inwardly into engagement with said tape, said fingers flexing to exert a pressure on said tape to prevent unwinding and retain the same on said reel.

5. A retaining means for tape wound on a reel, as set forth in claim 4, wherein said flexible fingers are formed of spring metal and are secured to said band instead of being integral therewith.

6. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges and having an elongated flexible finger secured to the inner surface of said band at each end, the thickness of each finger being substantially less than the width, whereby said band may embrace said flanges along a diameter with said fingers received between said flanges and projecting inwardly into engagement with said tape, said fingers flexing to exert a pressure on said tape to prevent unwinding and retain the same on said reel.

7. A retaining means for tape wound on a reel, said reel having a hub and spaced side flanges and with the tape wound on said hub between said flanges having a diameter less than the diameter of said flanges, said retaining means comprising an elongated reel flange embracing elastic band of less length than twice the diameter of said flanges plus twice the distance between said flanges and having an elongated flexible finger integral with said band at each end thereof, whereby said band may embrace said flanges along a diameter with said fingers received between said flanges and projecting inwardly into engagement with said tape, said fingers flexing to exert a pressure on said tape to prevent unwinding and retain the same on said reel.

8. A retaining means for tape wound on a reel, said reel having a hub and spaced side flanges and with the tape wound on said hub between said flanges having a diameter less than the diameter of said flanges, said retaining means comprising an elongated elastic reel flange engaging band of less length than twice the diameter of said flanges plus twice the distance between said flanges and having a flexible member connected to the inner surface of said band and extending inwardly thereof, said flexible member lying wholly within the confines of the peripheries of said flanges, whereby said band may embrace said flanges substantially along a diameter with said flexible member received between said flanges and projecting inwardly into engagement with said tape, said member exerting pressure on said tape to prevent unwinding and to retain the same on said reel.

9. A retaining means for tape wound on a reel, as set forth in claim 8, wherein said flexible member comprises a finger formed of spring metal.

References Cited in the file of this patent

UNITED STATES PATENTS

| | | |
|---|---|---|
| 1,881,383 | Wylie | Oct. 4, 1932 |
| 2,124,064 | Harris, Jr. | July 19, 1938 |
| 2,761,555 | Kulka | Sept. 4, 1956 |
| 2,765,908 | Kulka | Oct. 9, 1956 |
| 2,838,167 | Kulka | June 10, 1958 |

FOREIGN PATENTS

| | | |
|---|---|---|
| B30,320 | Germany | Sept. 1, 1955 |